US006411941B1

(12) United States Patent
Mullor et al.

(10) Patent No.: US 6,411,941 B1
(45) Date of Patent: Jun. 25, 2002

(54) METHOD OF RESTRICTING SOFTWARE OPERATION WITHIN A LICENSE LIMITATION

(75) Inventors: Miki Mullor; Julian Valiko, both of Ramat Hasharon (IL)

(73) Assignee: Beeble, Inc., Newport Beach, CA (US)

( * ) Notice: Subject to any disclaimer, the term of this patent is extended or adjusted under 35 U.S.C. 154(b) by 0 days.

(21) Appl. No.: 09/164,777

(22) Filed: Oct. 1, 1998

(30) Foreign Application Priority Data

May 21, 1998 (IL) ................................................ 124571

(51) Int. Cl.[7] .............................................. G06F 17/60
(52) U.S. Cl. ............................. 705/59; 705/50; 705/51; 705/53; 705/57
(58) Field of Search .............................. 705/51, 54, 56, 705/57, 58, 59, 1, 50, 52, 53; 713/187, 189, 200

(56) References Cited

U.S. PATENT DOCUMENTS

| | | | |
|---|---|---|---|
| 4,866,769 A | | 9/1989 | Karp |
| 4,903,296 A | | 2/1990 | Chandra et al. |
| 4,924,378 A | | 5/1990 | Hershey et al. |
| 5,386,369 A | | 1/1995 | Christiano |
| 5,390,297 A | | 2/1995 | Barber et al. |
| 5,479,639 A | * | 12/1995 | Ewertz et al. ............... 395/430 |
| 5,490,216 A | * | 2/1996 | Richadson, III ............... 380/4 |
| 5,671,412 A | | 9/1997 | Christiano |
| 5,684,951 A | * | 11/1997 | Goodman et al. ..... 395/188.01 |
| 5,754,763 A | | 5/1998 | Bereiter |
| 5,758,068 A | | 5/1998 | Brandt et al. |
| 5,758,069 A | | 5/1998 | Olsen |
| 5,790,664 A | | 8/1998 | Coley et al. |
| 5,826,011 A | | 10/1998 | Chou et al. |
| 5,892,900 A | * | 4/1999 | Ginter et al. ............... 395/186 |
| 5,905,860 A | | 5/1999 | Olsen et al. |
| 6,000,030 A | * | 12/1999 | Steinberg et al. ........... 713/200 |
| 6,006,190 A | | 12/1999 | Baena-Arnaiz et al. |
| 6,021,438 A | | 2/2000 | Duvvoori et al. |
| 6,023,763 A | | 2/2000 | Grumpstrup et al. |
| 6,052,600 A | * | 4/2000 | Fette et al. .................. 455/509 |
| 6,055,503 A | | 4/2000 | Horstmann |
| 6,067,582 A | * | 5/2000 | Smith et al. ..................... 710/5 |
| 6,073,256 A | | 6/2000 | Sesma |
| 6,078,909 A | | 6/2000 | Knutson |
| 6,128,741 A | | 10/2000 | Goetz et al. |
| 6,173,446 B1 | | 1/2001 | Khan et al. |
| 6,189,146 B1 | * | 2/2001 | Misra et al. .................. 717/11 |
| 6,192,475 B1 | | 2/2001 | Wallance |
| 6,198,875 B1 | * | 3/2001 | Edenson et al. .............. 386/94 |
| 6,226,747 B1 | | 5/2001 | Larsson et al. |
| 6,233,567 B1 | | 5/2001 | Cohen |
| 6,243,468 B1 | | 6/2001 | Pearce et al. |
| 6,272,636 B1 | | 8/2001 | Neville et al. |
| 6,298,138 B1 | | 10/2001 | Gotoh et al. |

FOREIGN PATENT DOCUMENTS

JP 408286906 A * 11/1996 ............. G06F/9/06

OTHER PUBLICATIONS

Dornbusch et al., Destop management software: no need to adjust your set., Infoworld, v17, n37, p60.*

* cited by examiner

*Primary Examiner*—Hyung-Sub Sough
*Assistant Examiner*—Calvin L Hewitt
(74) *Attorney, Agent, or Firm*—Venable; Robert Kinberg; Jeffri A. Kaminski

(57) ABSTRACT

A method of restricting software operation within a license limitation that is applicable for a computer having a first non-volatile memory area, a second non-volatile memory area, and a volatile memory area. The method includes the steps of selecting a program residing in the volatile memory, setting up a verification structure in the non-volatile memories, verifying the program using the structure, and acting on the program according to the verification.

19 Claims, 2 Drawing Sheets

METHOD OF RESTRICTING SOFTWARE OPERATION WITHIN A LICENSE LIMITATION

FIELD OF THE INVENTION

This invention relates to a method and system of identifying and restricting an unauthorized software program's operation.

BACKGROUND OF THE INVENTION

Numerous methods have been devised for the identifying and restricting of an unauthorized software program's operation. These methods have been primarily motivated by the grand proliferation of illegally copied software, which is engulfing the marketplace. This illegal copying represents billions of dollars in lost profits to commercial software developers.

Software based products have been developed to validate authorized software usage by writing a license signature onto the computer's volatile memory (e.g. hard disk). These products may be appropriate for restricting honest software users, but they are very vulnerable to attack at the hands of skilled system's programmers (e.g. "hackers"). These license signatures are also subject to the physical instabilities of their volatile memory media.

Hardware based products have also been developed to validate authorized software usage by accessing a dongle that is coupled e.g. to the parallel port of the P.C. These units are expensive, inconvenient, and not particularly suitable for software that may be sold by downloading (e.g. over the internet).

There is accordingly a need in the art to provide for a system and method that substantially reduce or overcome the drawbacks of hitherto known solutions.

SUMMARY OF THE INVENTION

The present invention relates to a method of restricting software operation within a license limitation. This method strongly relies on the use of a key and of a record, which have been written into the non-volatile memory of a computer.

For a better understanding of the underlying concept of the invention, there follows a specific non-limiting example. Thus, consider a conventional computer having a conventional BIOS module in which a key was embedded at the ROM section thereof, during manufacture. The key constitutes, effectively, a unique identification code for the host computer. It is important to note that the key is stored in a non-volatile portion of the BIOS, i.e. it cannot be removed or modified.

Further, according to the invention, each application program that is to be licensed to run on the specified computer, is associated with a license record; that consists of author name, program name and number of licensed users (for network). The license record may be held in either encrypted or explicit form.

Now, there commences an initial license establishment procedure, where a verification structure is set in the BIOS so as to indicate that the specified program is licensed to run on the specified computer. This is implemented by encrypting the license record (or portion thereof) using said key (or portion thereof) exclusively or in conjunction with other identification information) as an encryption key. The resulting encrypted license record is stored in another (second) non-volatile section of the BIOS, e.g. $E^2PROM$ (or the ROM). It should be noted that unlike the first non-volatile section, the data in the second non-volatile memory may optionally be erased or modified (using $E^2PROM$ manipulation commands), so as to enable to add, modify or remove licenses. The actual format of the license may include a string of terms that correspond to a license registration entry (e.g. lookup table entry or entries) at a license registration bureau (which will be further described as part of the preferred embodiment of the present invention).

Having placed the encrypted license record in the second non-volatile memory (e.g. the $E^2PROM$), the process of verifying a license may be o commenced. Thus, when a program is loaded into the memory of the computer, a so called license verifier application, that is a priori running in the computer, accesses the program under question, retrieves therefrom the license record, encrypts the record utilizing the specified unique key (as retrieved from the ROM section of the BIOS) and compares the so encrypted record to the encrypted records that reside in the $E^2PROM$. In the case of match, the program is verified to run on the computer. If on the other hand the sought encrypted data record is not found in the $E^2PROM$ database, this means that the program under question is not properly licensed and appropriate application define action is invoked (e.g. informing to the user on the unlicensed status, halting the operation of the program under question etc.)

Those versed in the art will readily appreciate that any attempt to run a program at an unlicensed site will be immediately detected. Consider, for example, that a given application, say Lotus 123, is verified to run on a given computer having a first identification code (k1) stored in the ROM portion of the BIOS thereof. This obviously requires that the license record (LR) of the application after having been encrypted using k1 giving rise to $(LR)_{k1}$ is stored in the $E^2PROM$ of the first computer.

Suppose now that a hacker attempts to run the specified application in a second computer having a second identification code (k2) stored in the ROM portion of the BIOS thereof. All or a portion the database contents (including of course $(LR)_{k1}$) that reside in the $E^2PROM$ portion in the first computer may be copied in a known per se means to the second computer. It is important to note that the hacker is unable to modify the key in the ROM of the second computer to K1, since, as recalled, the contents of the ROM is established during manufacture and is practically invariable.

Now, when the application under question is executed in the second computer, the license verifier retrieves said LR from the application and, as explained above, encrypts it using the key as retrieved from the ROM of the second computer, i.e k2 giving rise to encrypted license record $(LR)_{k2}$. Obviously, the value $(LR)_{k2}$ does not reside in the $E^2PROM$ database section of the second computer (since it was not legitimately licensed) and therefore the specified application is invalidated. It goes without saying that the data copied from the first (legitimate) computer is rendered useless, since comparing $(LR)_{k2}$ with the copied value $(LR)_{k1}$ results, of course, in mismatch.

The example above is given for clarity of explanation only and is by no means binding.

In its broadest aspect, the invention provides for a method of restricting software operation within a license limitation including; for a computer having a first non-volatile memory area, a second non-volatile memory area, and a volatile memory area; the steps of: selecting a program residing in the volatile memory, setting up a verification structure in the non-volatile memories, verifying the program using the structure, and acting on the program according to the verification.

An important advantage in utilizing non-volatile memory such as that residing in the BIOS is that the required level of system programming expertise that is necessary to intercept or modify commands, interacting with the BIOS, is substantially higher than those needed for tampering with data residing in volatile memory such as hard disk. Furthermore, there is a much higher cost to the programmer, if his tampering is unsuccessful, i.e. if data residing in the BIOS (which is necessary for the computer's operability) is inadvertently changed by the hacker. This is too high of a risk for the ordinary software hacker to pay. Note that various recognized means for hindering the professional-like hacker may also be utilized (e.g. anti-debuggers, etc.) in conjunction with the present invention.

In the context of the present invention, a "computer" relates to a digital data processor. These processors are found in personal computers, or on one or more processing cards in multi-processor machines. Today, a processor normally includes a first non-volatile memory, a second non-volatile memory, and data linkage access to a volatile memory. There are also processors having only one non-volatile memory or having more than two non-volatile memories; all of which should be considered logically as relating to having a first and a second non-volatile memory areas. There are also computational environments where the volatile memory is distributed into numerous physical components, using a bus, LAN, etc.; all of which should logically be considered as being a volatile memory area.

According to the preferred embodiment of the present invention, there is further provided a license authentication bureau which can participate in either or both of:

(i) establishing the license record in the second non-volatile memory; and (ii) verifying if the key and license record in the non-volatile memory(s) is compatible with the license record information as extracted from the application under question.

The bureau is a telecommunications accessible processor where functions such as formatting, encrypting, and verifying may be performed. Performing these or other functions at the bureau helps to limit the understanding of potential software hackers; since they can not observe how these functions are constructed. Additional security may also be achieved by forcing users of the bureau to register, collecting costs for connection to the bureau, logging transactions at the bureau, etc.

According to one example of using the bureau, setting up a verification structure further includes the steps of: establishing, between the computer and the bureau, a two-way data-communications linkage; transferring, from the computer to the bureau, a request-for-license including an identification of the .computer and the license-record's contents from the selected program; forming an encrypted license-record at the bureau by encrypting parts of the request-for-license using part of the identification as the encryption key; and transferring, from the bureau to the computer, the encrypted license-record.

According to another example of using the bureau, verifying the program further includes the steps of: establishing, between the computer and the bureau, a two-way data-communications linkage; transferring, from the computer to the bureau, a request-for-license-verification including an identification of the computer, the encrypted license-record for the selected program from the second non-volatile memory, and the licensed-software-program's license-record contents; enabling the comparing at the bureau; and transferring, from the bureau to the computer, the result of the comparing.

The actual key that serves for identifying the computer may be composed of the pseudo-unique key exclusively, or, if desired, in combination with information, e.g. information related to the registration of the user such as e.g. place, telephone number, user name, license number, etc. In the context of the present invention, a "pseudo-unique" key may relate to a bit string which uniquely identifies each first non-volatile memory. Alternately the "pseudo-unique" key may relate to a random bit string (or to an assigned bit string) of sufficient length such that: there is an acceptably low probability of a successful unauthorized transfer of licensed software between two computers, where the first volatile memories of these two computers have the same key.

It should be noted that the license bureau might maintain a registry of keys and of licensed programs that have been registered at the bureau in association with these keys. This registry may be used to help facilitate the formalization of procedures for the transfer of ownership of licensed software from use on one computer to use on another computer.

Constructing the key in the manner specified may hinder the hacker in cracking the proposed encryption scheme of the invention, in particular when the establishment of the license record or the verification thereof is performed in the bureau. Those versed in the art will readily appreciate that the invention is by no means bound by the data, the algorithms, or the manner of operation of the bureau. It should be noted that the tasks of establishing and/or verifying a license record may be shared between the bureau and the computer, done exclusively at the computer, or done exclusively at the bureau. The pseudo-unique key length needs to be long enough to hinder encryption attack schemes. The establishing of the key may be done at any time from the non-volatile memory's manufacture until an attempted use of an established license-record in the non-volatile memory. The key is used for encryption or decryption operations associated with license-records. In principle, the manufacturer of the licensed-software-program may specify the license-record format and therefore different formats may, if desired, be used for respective applications.

According to the preferred embodiment of the present invention, the pseudo-unique key is a unique-identification bit string that is written onto the first non-volatile memory by the manufacturer of the is memory media.

According to one, non-limiting, preferred embodiment of the present invention, the first non-volatile memory area is a ROM section of a BIOS; the second non-volatile memory area is a $E^2$PROM section of a BIOS; and the volatile memory is a RAM e.g. hard disk and/or internal memory of the computer.

The present invention also relates to a non-volatile memory media used as a BIOS of a computer, for restricting software operation within a license limitation, wherein a pseudo-unique key is established.

According to the preferred embodiment of the non-volatile memory media of the present invention, the pseudo-unique key is established in a ROM section of the BIOS.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
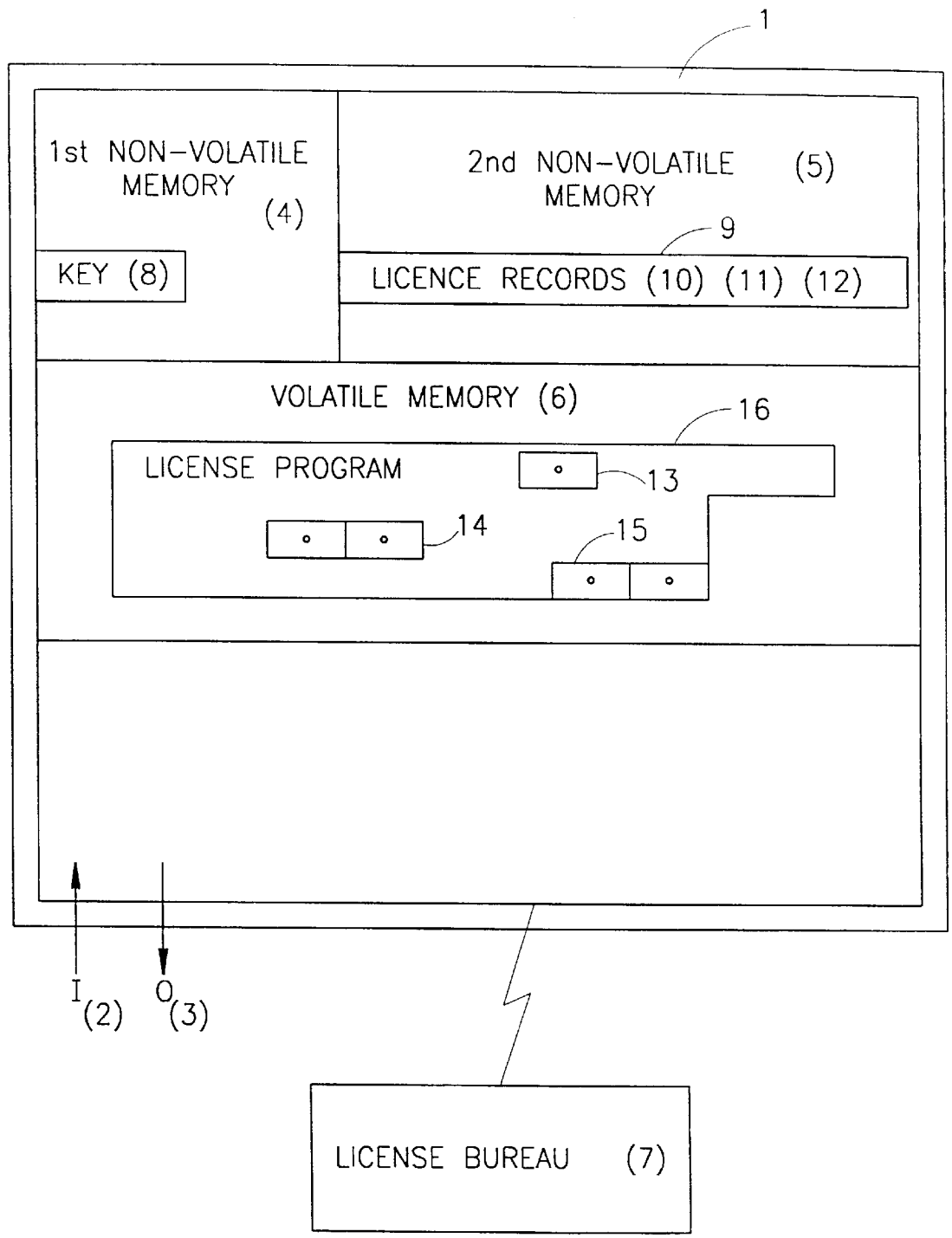
FIG. 1 is a schematic diagram of a computer and a license bureau.

A schematic diagram of a computer and a license bureau is shown in FIG. 1. Thus, a computer processor (1) is associated with input operations (2) and with output operations (3). This computer (processor) internally contains a first non-volatile memory area (4) (e.g. the ROM section of the BIOS), a second non-volatile memory area (5) (e.g. the $E^2PROM$ section of the BIOS), and a volatile memory area (6) (e.g. the internal RAM memory of the computer).

The computer processor is in temporary telecommunications linkage with a license bureau (7).

The first non-volatile memory includes a pseudo-random identification key (8), which exclusively or in combination with other information (e.g. user name), is sufficient to uniquely differentiate this first non-volatile memory from all other first non-volatile memories. As specified before, said key constitutes unique identification of the computer.

The second non-volatile memory includes a license-record-area (9) e.g. which contains at least one encrypted license-record (e.g. three records 10–12). The volatile memory accommodates a license program (16) having license record fields (13–15) appended thereto. By way of example said fields stand for Application names (e.g. Lotus 123), Vendor name (Lotus inc.), and number of licensed copies (1 for stand alone usage, >1 for number of licensed users for a network application).

Those versed in the art will readily appreciate that the license record is not necessarily bound to continuous fields. In fact, the various license content components of the data record may be embedded in various locations in the application. Any component may, if desired, be encrypted.

Each one of the encrypted license records (10–12) is obtained by encrypting the corresponding license record as extracted from program 16, utilizing for encryption the identification key (8).

In a typical, yet not exclusive, sequence of operation, a transaction/request is sent, by the computer to the bureau. This transaction includes the key (8), the encrypted license-records (10–12), contents from the license program used in forming a license record (e.g. fields 13–15), and other items of information as desired.

The bureau forms the proposed license-record from the contents, encrypts (utilizing predetermined encryption algorithm) the so formed license-record using the key (8), and compares the so formed encrypted license-record with the license-record (10–12). The bureau generates an overlay according to the result of the comparison indicating successful comparison, non-critical failure comparison and the critical failure comparison.

The bureau returns the overlay which will direct the computer in subsequent operation. Thus, a success overlay will allow the license program to operate. A non-critical failure overlay will ask for additional user interactions. A critical failure overlay will cause permanent disruption to the computer's BIOS operations. Thus, software operation of the program is methodologically according to a license limitation restriction.

Those versed in the art will readily appreciate that the implementation as described with reference to FIG. 1 is by no means binding. Thus, by way of non-limiting example, the bureau, instead of being external entity may form part of the computer.

Figure 2:
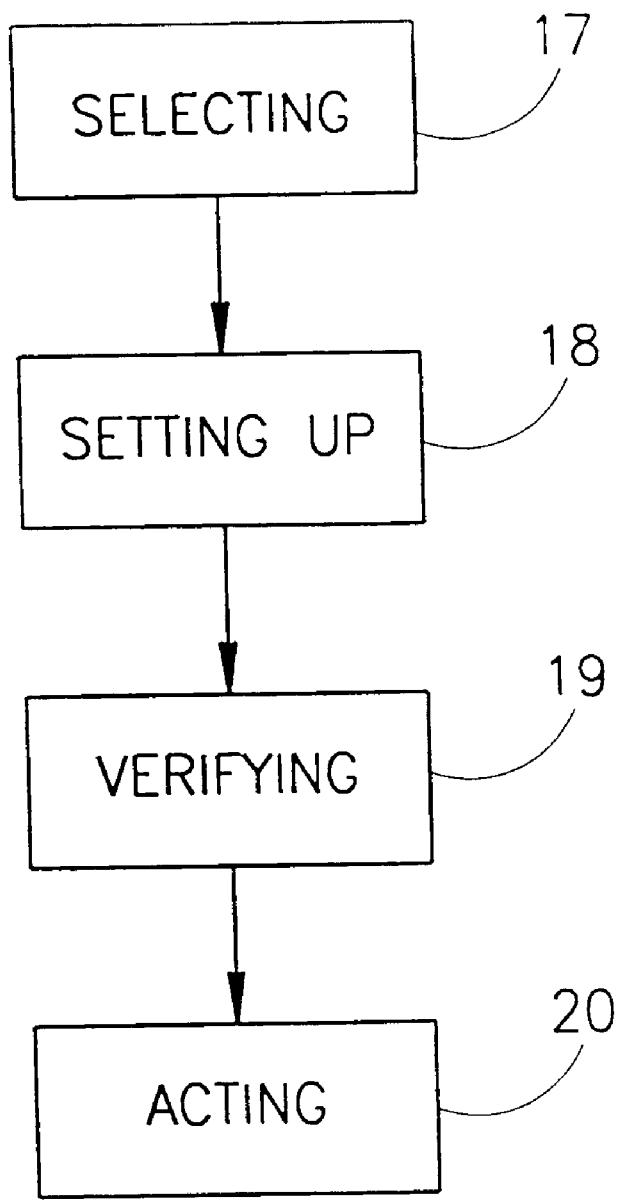
FIG. 2 is a generalized flow chart of the sequence of operations performed according to one embodiment of the invention.

Attention is now directed to FIG. 2, showing a generalized flow chart of the sequence of operations performed according to one embodiment of the invention.

Thus, selecting (17) a program includes the step of: establishing a licensed-software-program in the volatile memory of the computer wherein the licensed-software-program includes contents used to form a license-record. These contents, be they centralize or decentralized, may include terms, identifications, specifications, or limitations related to the manufacturer of a software product, the distributor of a software product, the purchaser of a software product, a licensor, a licensee, items of computer hardware or components thereof, or to other terms and conditions related to the aforesaid.

Setting up (18) the verification structure includes the steps of: establishing or certifying the existence of a pseudo-unique key in the first non-volatile memory area; and establishing at least one license-record location in the first or the second nonvolatile memory area.

Establishing a license-record includes the steps of: forming a license-record by encrypting of the contents used to form a license-record with other predetermined data contents, using the key; and establishing the encrypted license-record in one of the at least one established license-record locations (e.g. 10–12 in FIG. 1).

Verifying (19) the program includes the steps of: encrypting the licensed-software-program's license-record contents from the volatile memory area or decrypting the license-record in the first or the second non-volatile memory area, using the key; and comparing the encrypted licensed-software-program's license-record contents with the encrypted license-record in the first or the second non-volatile memory area, or comparing the licensed-software-program's license-record contents with the decrypted license-record in the first or the second non-volatile memory area.

Acting (20) on the program includes the step of: restricting the program's operation with predetermined limitations if the comparing yields non-unity or insufficiency. In this context "non-unity" relates to being unequal with respect to a specific equation (e.g. A=B+1); and "insufficiency" relates to being outside of a relational bound (e.g. A>B+1). "Restricting the program's operation with predetermined limitations" may include actions such as erasing the software in volatile memory, warning the license applicant/user, placing a fine on the applicant/user through the billing service charges collected at the license bureau (if applicable), or scrambling sections of the BIOS of the computer (or of functions interacting therewith).

The present invention has been described with a certain degree of particularity but it should be understood that various modifications and alterations may be made without departing from the scope or spirit of the invention as defined by the following claims.

What is claimed is:

1. A method of restricting software operation within a license for use with a computer including an erasable, non-volatile memory area of a BIOS of the computer, and a volatile memory area; the method comprising the steps of:

selecting a program residing in the volatile memory, using an agent to set up a verification structure in the erasable, non-volatile memory of the BIOS, the verification structure accommodating data that includes at least one license record, verifying the program using at least the verification structure from the erasable non-volatile memory of the BIOS, and acting on the program according to the verification.

2. A method according to claim 1, further comprising the steps of:

establishing a license authentication bureau.

3. A method according to claim 2, wherein setting up a verification structure further comprising the steps of: establishing, between the computer and the bureau, a two-way data-communications linkage; transferring, from the computer to the bureau, a request-for-license including an identification of the computer and the license-record's contents from the selected program; forming an encrypted license-record at the bureau by encrypting parts of the request-for-license using part of the identification as an encryption key; transferring, from the bureau to the computer, the encrypted license-record; and storing the encrypted license record in the erasable non-volatile memory area of the BIOS.

4. A method according to claim 2, wherein verifying the program further comprises the steps of: establishing, between the computer and the bureau, a two-way data-communications linkage; transferring, from the computer to the bureau, a request-for-license verification including an identification of the computer, an encrypted license-record for the selected program from the erasable, non-volatile memory area of the BIOS, and the program's license-record; enabling the comparing at the bureau; and transferring, from the bureau to the computer, the result of the comparing.

5. A method according to claim 3 wherein the identification of the computer includes the unique key.

6. A method according to claim 1 wherein selecting a program includes the steps of: establishing a licensed-software-program in the volatile memory of the computer wherein said licensed-software-program includes contents used to form the license-record.

7. A method according to claim 6 wherein using an agent to set up the verification structure includes the steps of: establishing or certifying the existence of a pseudo-unique key in a first non-volatile memory area of the computer; and establishing at least one license-record location in the first nonvolatile memory area or in the erasable, non-volatile memory area of the BIOS.

8. A method according to claim 6 wherein establishing a license-record includes the steps of: forming a license-record by encrypting of the contents used to form a license-record with other predetermined data contents, using the key; and establishing the encrypted license-record in one of the at least one established license-record locations.

9. A method according to claim 7 wherein verifying the program includes the steps of: encrypting the licensed-software-program's license-record contents from the volatile memory area or decrypting the license-record in the erasable, non-volatile memory area of the BIOS, using the pseudo-unique key; and comparing the encrypted licenses-software-program's license-record contents with the encrypted license-record in the erasable, non-volatile memory area of the BIOS, or comparing the license-software-program's license-record contents with the decrypted license-record in erasable non-volatile memory area of the BIOS.

10. A method according to claim 9 wherein acting on the program includes the step: restricting the program's operation with predetermined limitations if the comparing yields non-unity or insufficiency.

11. A method according to claim 1 wherein the volatile memory is a RAM.

12. The method of claim 1, wherein a pseudo-unique key is stored in the non-volatile memory of the BIOS.

13. The method of claim 1, wherein a unique key is stored in a first non-volatile memory area of the computer.

14. The method according claim 13, wherein the step of using the agent to set up the verification record, including the license record, includes encrypting a license record data in the program using at least the unique key.

15. The method according to claim 14, wherein the verification comprises:

extracting the license record from the software program;

encrypting the license record using the unique key stored in the first non-volatile memory area of the computer to form second encrypted license information; and comparing the encrypted license information stored in the erasable, non-volatile memory area of the BIOS of the computer with the second encrypted license information.

16. The method according to claim 13, wherein the step of verifying the program includes a decrypting the license record data accommodated in the erasable second non-volatile memory area of the BIOS using at least the unique key.

17. The method according to claim 13, wherein the step of verifying the program includes encrypting the license record that is accommodated in the program using at least the unique key.

18. A method for accessing an application software program using a pseudo-unique key stored in a first non-erasable non-volatile memory area of a computer, the first non-volatile memory area being unable to be programmatically changed, the method, comprising:

loading the application software program residing in a non-volatile memory area of the computer;

using an agent to perform the following steps:
extracting license information from software program;
encrypting license information using the pseudo-unique key stored in the first non-volatile memory area;
storing the encrypting license information in a second erasable, writable, non-volatile memory area of the BIOS of the computer;
subsequently verifying the application software program based on the encrypted license information stored in the second erasable, writable, non-volatile memory area of the BIOS; and
acting on the application software program based on the verification.

19. The method of claim 18, wherein the verification comprises:

extracting the license information from the software program;

encrypting the license information using the pseudo-unique key stored in the first non-volatile memory area of the computer to form second encrypted license information; and comparing the encrypted license information stored in the second erasable, writable, non-volatile memory area of the BIOS of the computer with the second encrypted license information.

* * * * *

(12) EX PARTE REEXAMINATION CERTIFICATE (7545th)
United States Patent
Mullor et al.

(10) Number: US 6,411,941 C1
(45) Certificate Issued: Jun. 1, 2010

(54) METHOD OF RESTRICTING SOFTWARE OPERATION WITHIN A LICENSE LIMITATION

(75) Inventors: Miki Mullor, Ramat Hasharon (IL); Julian Valiko, Ramat Hasharon (IL)

(73) Assignee: Ancora Technologies Inc., Irvine, CA (US)

Reexamination Request:
No. 90/010,560, May 29, 2009

Reexamination Certificate for:
Patent No.: 6,411,941
Issued: Jun. 25, 2002
Appl. No.: 09/164,777
Filed: Oct. 1, 1998

(30) Foreign Application Priority Data

May 21, 1998 (IL) ................................................ 124571

(51) Int. Cl.
*G06F 21/22* (2006.01)

(52) U.S. Cl. .............................. 705/59; 705/50; 705/51; 705/53; 705/57

(58) Field of Classification Search ...................... 705/59
See application file for complete search history.

(56) References Cited

U.S. PATENT DOCUMENTS 5,734,819 A * 3/1998 Lewis ........................... 726/29
6,153,835 A * 11/2000 Schwartz et al. .......... 177/25.13

OTHER PUBLICATIONS

Microsoft Computer Dictionary, 5$^{th}$ Edition, 2002, p. 60.*

* cited by examiner

*Primary Examiner*—Matthew Heneghan

(57) ABSTRACT

A method of restricting software operation within a license limitation that is applicable for a computer having a first non-volatile memory area, a second non-volatile memory area, and a volatile memory area. The method includes the steps of selecting a program residing in the volatile memory, setting up a verification structure in the non-volatile memories, verifying the program using the structure, and acting on the program according to the verification.

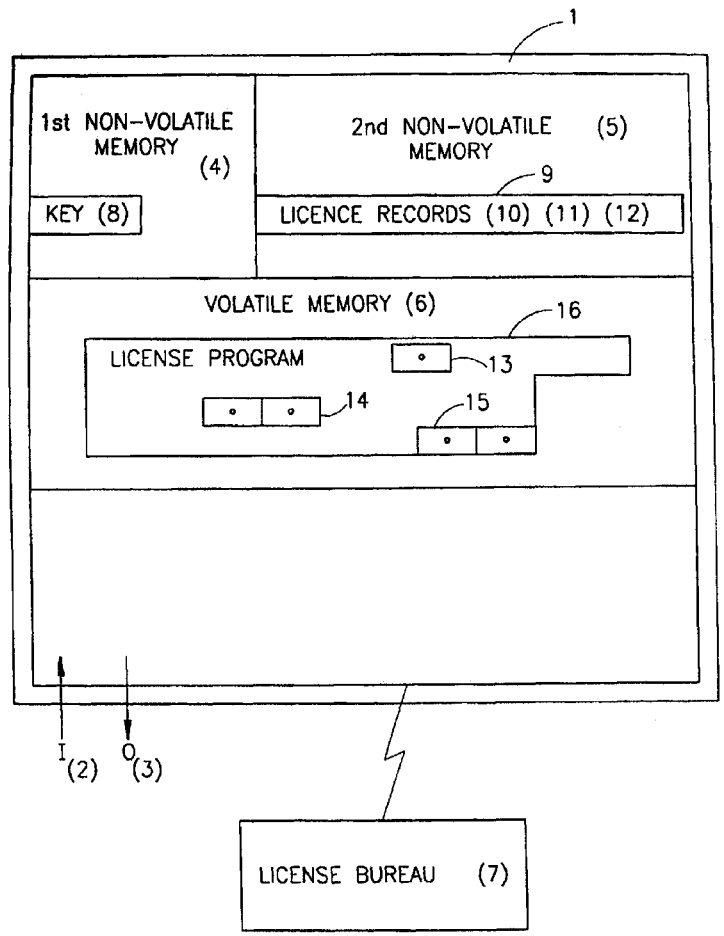

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *